United States Patent
Lee

(10) Patent No.: US 8,458,736 B2
(45) Date of Patent: Jun. 4, 2013

(54) APPARATUS FOR CLAMPING DISK AND SPINDLE MOTOR HAVING THE SAME

(75) Inventor: Tae Wook Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/263,196

(22) PCT Filed: Apr. 6, 2010

(86) PCT No.: PCT/KR2010/002099
§ 371 (c)(1),
(2), (4) Date: Oct. 6, 2011

(87) PCT Pub. No.: WO2010/117190
PCT Pub. Date: Oct. 14, 2010

(65) Prior Publication Data
US 2012/0042330 A1 Feb. 16, 2012

(30) Foreign Application Priority Data
Apr. 6, 2009 (KR) .................. 10-2009-0029311

(51) Int. Cl.
*G11B 17/028* (2006.01)
(52) U.S. Cl.
USPC .......................................... 720/707
(58) Field of Classification Search
USPC .......................................... 720/707
See application file for complete search history.

(56) References Cited

U.S. PATENT DOCUMENTS

| 7,493,633 | B2 * | 2/2009 | Ikemoto .................. | 720/707 |
|---|---|---|---|---|
| 7,581,235 | B2 * | 8/2009 | Oota ...................... | 720/707 |
| 7,802,273 | B2 * | 9/2010 | Kim et al. .............. | 720/709 |
| 7,900,223 | B2 * | 3/2011 | Takaki et al. .......... | 720/707 |
| 7,962,928 | B2 * | 6/2011 | Iwai et al. .............. | 720/707 |
| 7,992,160 | B2 * | 8/2011 | Takaki et al. .......... | 720/707 |
| 8,015,577 | B2 * | 9/2011 | Smirnov ................. | 720/707 |
| 8,015,578 | B2 * | 9/2011 | Smirnov et al. ........ | 720/707 |
| 8,091,099 | B2 * | 1/2012 | Lee ........................ | 720/707 |

FOREIGN PATENT DOCUMENTS

| JP | 04-251554 A | 9/1992 |
|---|---|---|
| KR | 10-2008-0105815 A | 12/2008 |
| KR | 10-2008-0113635 A | 12/2008 |

OTHER PUBLICATIONS

International Search Report in International Application No. PCT/KR2010/002099, filed Apr. 6, 2010.

* cited by examiner

*Primary Examiner* — Mark Blouin
(74) *Attorney, Agent, or Firm* — Saliwanchik, Lloyd & Eisenschenk

(57) ABSTRACT

The disk clamp apparatus and a spindle motor having the same according to the present invention has an industrial applicability in that a radial force of a claw on a disk is greater than a radial force of an arm to the disk to prevent the radial force of the arm applying to the disk from affecting the disk, whereby matched center of the clamp body with a center of the disk by the law is not affected by an arm, such that the center of the disk comes to have a relatively smaller deviation from the center and to thereby enhance the reliability of the product.

15 Claims, 2 Drawing Sheets

APPARATUS FOR CLAMPING DISK AND SPINDLE MOTOR HAVING THE SAME

CROSS-REFERENCE TO RELATED APPLICATION

This application is the U.S. national stage application of International Patent Application No. PCT/KR2010/002099, filed Apr. 6, 2010, which claims priority to Korean Application No. 10-2009-0029311, filed Apr. 6, 2009, the disclosures of each of which are incorporated herein by reference in their entirety.

TECHNICAL FIELD

The present invention relates to an apparatus for clamping disk and a spindle motor having the same.

BACKGROUND ART

A spindle motor performs the function of rotating a disk to enable an optical pickup which linearly reciprocates in an optical disk drive (ODD) to read data recorded on the disk. A slim-type spindle motor used for a notebook is installed with a clamping device for supporting the disk.

Generally, an apparatus for clamping disk (hereinafter referred to as "disk clamping apparatus") includes a clamp body, claws formed at a lateral surface of the clamp body to apply pressure to an inner circumference of a disk and to match the center of the disk with that of a rotation shaft, and an arm applying pressure to the disk to prevent the disk from being disengaged.

The conventional disk clamping apparatus suffers from disadvantages in that a force applied to an inner circumference of a disk by claws is almost the same as or greater than a force applied to the disk by an arm, whereby even though the claws apply pressure to the claws, a rotation center of the disk is eccentrically deviated from a rotation center of a rotation shaft.

In a case the force applied to the disk by the arm is the same as or greater than the force applied to the disk by the claws, a rotation center of the disk relative to a rotation center of the rotation shaft is eccentricated by approximately 80 μm to 120 μm.

In a case the rotation center of the disk relative to the rotation center of the rotation shaft is eccentrically disengaged by approximately 80 μm to 120 μm, the disk eccentrically rotates relative to the rotation shaft to disable an accurate recording of data on a designated position of the disk. Another disadvantage is that in a case the disk eccentrically rotates relative to the rotation shaft, the data cannot be read from a particular position of the disk.

DISCLOSURE OF INVENTION

Technical Problem

The present invention is disclosed to obviate the above-mentioned problems, and it is an object to provide a disk clamping apparatus configured to improve claw and arm structures whereby a rotation center of a disk with a rotation center of a rotation shaft can be accurately arranged. Another object is to provide a spindle motor having a disk clamping apparatus.

Solution to Problem

In one general aspect of the present invention, there is provided a disk clamping apparatus comprising a clamp body configured to be inserted into an inner circumference of a disk; at least two claws formed on a lateral surface of the clamp body to apply pressure to an inner lateral surface of the disk with a first elasticity; and at least two arms formed at a lateral surface of the clamp body to contact a corner formed by the inner circumference of the disk and an upper surface of the disk contacting the inner circumference of the disk and to apply pressure to the inner circumference of the disk with a second elasticity which is weaker than the first elasticity.

In another general aspect of the present invention, there is provided a spindle motor having a disk clamping apparatus comprising a stator; a rotor having a rotation shaft rotating relative to the stator; a clamp body coupled to the rotation shaft and inserted into an inner circumference of a disk; at least two claws formed on a lateral surface of the clamp body to apply pressure to an inner lateral surface of the disk with a first elasticity; and at least two arms formed at a lateral surface of the clamp body to contact a corner formed by the inner circumference of the disk and an upper surface of the disk contacting the inner circumference of the disk and to apply pressure to the inner circumference of the disk with a second elasticity which is weaker than the first elasticity.

Advantageous Effects of Invention

The disk clamp apparatus and a spindle motor having the same according to the present invention is advantageous in that a radial force of a claw on a disk is greater than a radial force of an arm to the disk to prevent the radial force of the arm applying to the disk from affecting the disk, whereby matched center of the clamp body with a center of the disk by the claw is not affected by an arm, such that the center of the disk comes to have a relatively smaller deviation from the center of the clamp body to further enhance the reliability of the product.

BEST MODE FOR CARRYING OUT THE INVENTION

A disk clamp apparatus and a spindle motor having the same according to the exemplary embodiment of the present invention will be described in detail with reference to the accompanying drawings.

Figure 1:
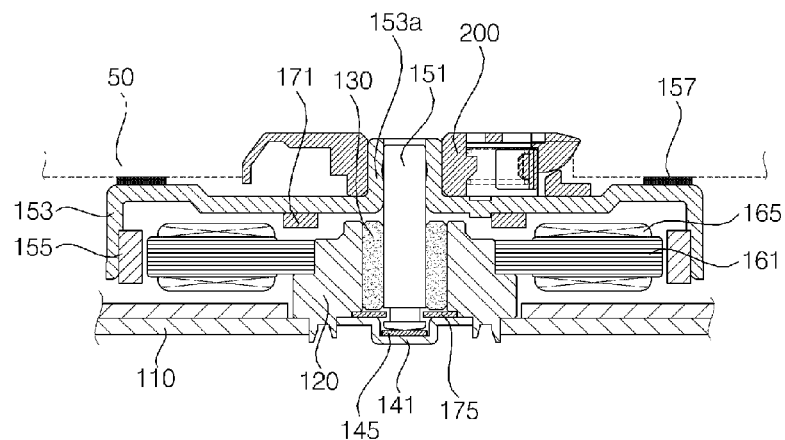
FIG. 1 is a cross-sectional view illustrating a disk clamp apparatus and a spindle motor having the same according to an exemplary embodiment of the present invention.

FIG. 1 is a cross-sectional view illustrating a disk clamp apparatus and a spindle motor having the same according to an exemplary embodiment of the present invention.

Referring to FIG. 1, a cylindrical bearing housing 120 is vertically installed relative to the base 110.

In designating a direction and a surface of constituent parts, a direction and a surface facing an upper vertical side of the base 110 are respectively called "an upper side" and "an upper surface", while a direction and a surface facing a bottom vertical side of the base are respectively called "a bottom side" and "a bottom surface". A stator is provided at an upper surface of the base 110.

The cylindrical bearing housing 120 is opened at both ends, and a bearing 130 is fixed at an inner circumference of the bearing housing 120. A thrust stopper 141 for supporting a rotation shaft (described later) is formed at a bottom end of the bearing housing 120.

The bearing housing 120 is formed with a stator at a periphery thereof, and the stator includes a disk-shaped core 161 having an opening coupled to a periphery of the bearing housing 120, and a coil wound on the core 161.

An inner circumference of the bearing 130 formed inside the bearing housing 120 is rotatively formed with a rotation shaft 151. A periphery of the rotation shaft 151 exposed to the bearing housing 120 is coupled to a bottom-opened cylindrical rotor yoke 153, and an inner circumference of the rotor yoke 153 is coupled with a magnet 155. The magnet 155 is arrange to face the coil 165 of the core 161 coupled to the bearing housing 120.

The rotor yoke 153 is mounted thereon with a disk 50, where the rotation shaft 151, the rotor yoke 153 and the magnet 155 form a rotor.

An upper surface edge of the rotor yoke 153 is formed with a felt 157 for preventing a rotational slip of the disk rotating at a high speed by being brought into contact with the disk 50. A bottom surface of the rotor yoke 153 is formed with a suction magnet 171 for preventing the rotation shaft 151 from floating when the rotor is rotated at a high speed. It should be apparent that the suction magnet 171 is formed at the core 161 of the stator instead of the rotor yoke 153.

In a case a current flows in the coil 165, the rotation shaft 151 and the rotor yoke 153 are rotated by the electromagnetic force formed by the magnet 155 and the coil 165. A coupling pipe 153*a* may be protrusively formed at an upper surface of the rotor yoke 153 for increasing the coupled area with the rotation shaft 151.

Figure 2:
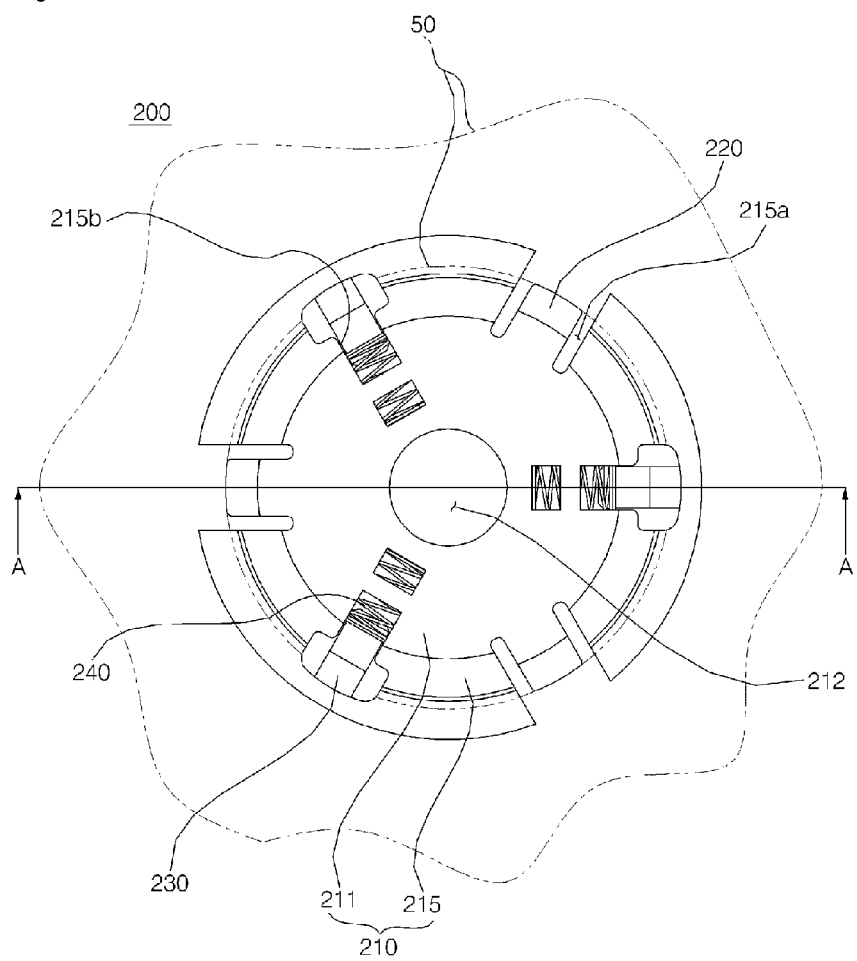
FIG. 2 is a plan view illustrating a disk clamp apparatus illustrated in FIG. 1.

A thrust plate 145 illustrated in FIG. 2 is interposed between the rotation shaft 151 and the thrust stopper 141 to allow the thrust plate 145 and the rotation shaft 151 to be brought into contact each other for prevention of tear and wear of the rotation shaft 140 and the thrust stopper 141.

Meanwhile, a groove formed along the periphery of the rotation shaft 151 is formed at a bottom end of the rotation shaft 151, and the groove is arranged with a washer stopper 175 for preventing the rotation shaft 151 from disengaging from the bearing housing 120. The coupling pipe 153*a* inserted into the rotation shaft 151 is coupled with a disk clamping apparatus 200 for supporting the disk 50 mounted on the rotor yoke 153.

MODE FOR THE INVENTION

Now, the disk clamping apparatus 200 according to the present exemplary embodiment of the present invention will be described in detail with reference to FIG. 1 to FIGS. 2 and 3.

Figure 3:
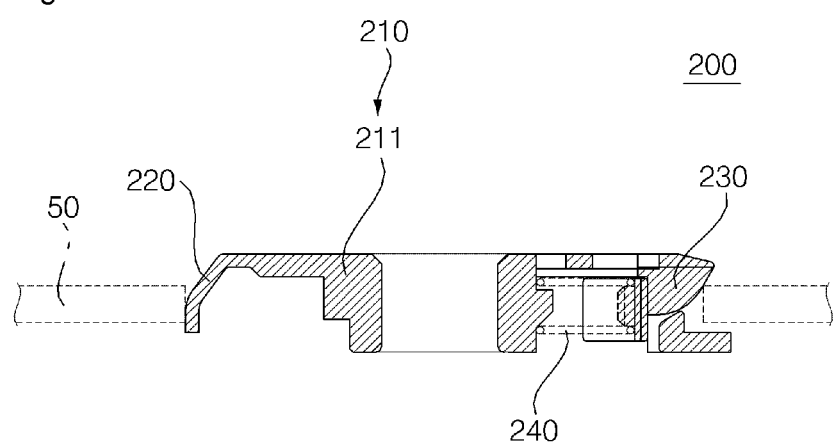
FIG. 3 is a cross-sectional view taken along "A-A" of FIG. 2.

FIG. 2 is a plan view illustrating a disk clamp apparatus illustrated in FIG. 1, and FIG. 3 is a cross-sectional view taken along "A-A" of FIG. 2.

Referring to FIGS. 2 and 3, the disk clamping apparatus 200 includes a cylindrical clamp body 210, a plurality of claws 220, a plurality of arms 230 and a coupling spring 240 coupled with the arms 230.

The clamp body 210 includes a disk-shaped coupling plate 211 and a ring-shaped lateral plate 215 bent downwards from an edge of the coupling plate 211 for allowing an inner circumference of the disk 50 to be inserted into a periphery thereof. The coupling plate 211 is centrally formed with a coupling hole 212 for coupling with the coupling pipe 153*a* rotating along with the rotation shaft 151.

The plurality of claws 220 is protruded to the edge of the coupling plate 211 and the lateral plate 215 in the cantilever way from at least two radially-formed through holes 215*a* based on the coupling plate 211. At least two claws 220 are formed from the lateral plate 215 of the clamp body 210, each claw 220 distanced at a predetermined same space apart. The claws 220 apply pressure to an inner circumference of the disk 50 inserted into the clamp body 210 to align the disk 50 so that the rotation center of the disk 50 and the center of the rotation shaft 151 are aligned.

The claws 220 apply pressure to the inner circumference of the disk 50 inserted into the clamp body 210 at a first elasticity in order for the rotation center of the disk 50 and the center of the rotation shaft 151 to be aligned by the cantilevered claws 210.

Each of the conventional claws 220 has an approximate thickness of 0.4 mm, where the elasticity generated by the 0.4 mm thickness claw is smaller than the elasticity generated by the arm 230. (described later) to fail to apply a sufficient pressure to the inner circumference of the disk 50. Therefore, in the present exemplary embodiment, each claw has a thickness of approximately 0.45 mm to approximately 0.50 mm to make the elasticity from each claw 220 greater than the elasticity generated by the arm 230.

Each claw 220 is brought into contact with the inner circumference of the disk 50 inserted into the lateral plate 215, where the claws 220 elastically supports the disk 50 to align the center of the disk 50 with the center of the coupling plate 211. That is, the claw 220 elastically supports in such a manner that the center of the disk 50 aligns the center of the rotation shaft 151.

An entry hole 215*b* is formed at the coupling plate 211 between the mutually adjacent through holes 215*a* and at the lateral plate 215, where the entry hole 215*b* is installed with the arm 230 for linear and rotational motion. That is, one side of the arm 230 is positioned at an external side of the lateral plate 215 while the other side of the arm is positioned inside the lateral plate 215 to enter or leave the entry hole 215*b*.

In the present exemplary embodiment, at least three claws 220 are formed at the clamp body 210 each at an evenly spaced distance and the arms 230 are arranged among the claws 220, where each arm 230 is also spaced at an even distance apart. In the present exemplary embodiment, each claw and each arm 230 are formed in the same number.

In a case the disk 50 is lowered from an upper side of the clamp body 210, an upper surface of one end of the arm 230 is contacted by an inner lower corner of the disk 50. In a case the disk 50 is further lowered from an upper side of the clamp body 210, the arm 230 seesawly rotates clockwise and linearly moves to the inner side of the lateral plate 215 at the same time.

In a case the disk 50 is completely inserted into the lateral plate 215 to be mounted on the rotor yoke 153, the arm 230 seesawly rotates counterclockwise and linearly moves to the outside of the lateral plate 215 at the same time, whereby the inner upper corner of the disk 50 is hitched by the lower end of the arm 230 to prevent the disk 500 from being disengaged toward the upper side of the clamp body 210.

The spring 240 is supported at one side thereof by an inner side of the clamp body 210 and is supported at the other side thereof by the other side of the arm 230 to elastically support the arm 230 toward the lateral plate 215, whereby the disk 50 is securely supported by the arm 230. In the present exemplary embodiment, the arm applies pressure to the disk 50 with a second elasticity which is smaller in power than a first elasticity of the claw 220.

The claw 220 is integrally formed with the clamp body 210 and the arm 230 is movably formed inside the clamp body 210, such that a radial force from each claw 220 to the disk 50 is almost equal, while a radial force applied to the disk 50 from the spring 240 via each arm 230 has some deviation.

Therefore, if the second elasticity by the arm 230 is greater than the first elasticity by the claw 220, the center of the disk 50 may not match with the center of the clamp body 210 due to the arm 230.

The disk clamping apparatus 200 according to the present exemplary embodiment is set up in such a fashion that each first radial elasticity applied from the claw 220 to the disk 50 is greater than each second radial elasticity applied from the spring 240 to the disk 50 via the arm 230. A total sum of first elasticity generated by each claw 220 is greater than a total sum of second elasticity generated by each arm 230. Thus, in a case the disk 50 is inserted into the clamp body 210, the arm 230 is securely fixed to the disk 50 by the first radial elasticity applied to the disk 50 from the spring 240 via the arm 230, and the rotational center of the disk 50 and the rotational center of the rotation shaft are accurately matched by the second radial elasticity applied to the disk 50 from the claw 220.

At this time, each first radial elasticity applied to the disk 50 from the claw 220 is greater by 110% than, but less by 210% than the each second radial elasticity applied to the disk 50 from the spring 240 via the arm 230. To be more specific, the first elasticity generated by the claw 220 may be greater by 130~170% than the second elasticity generated by the arm 230.

The following Table 1 shows data of deviation between the center of the disk 50 and the center of the rotation shaft 151, which is the deviation between the center of the disk 50 and the center of the clamp body 210 when the disk 50 is inserted into the disk clamping apparatus 200. The Table 1 shows data in which the first radial elasticity applied to the disk 50 from the claw 220 is 100~210% of the second radial elasticity applied to the disk 50 from the spring 240 via the arm 230.

TABLE 1

| classification | 100% | 110% | 120% | 130% | 140% | 150% | 160% | 170% | 180% | 190% | 200% | 210% |
|---|---|---|---|---|---|---|---|---|---|---|---|---|
| minumum deviation (μm) | 22 | 20 | 18 | 16 | 16 | 17 | 15 | 14 | 12 | 10 | 10 | 10 |
| maximum deviation (μm) | 125 | 107 | 98 | 83 | 79 | 76 | 76 | 75 | 72 | 70 | 68 | 65 |
| average (μm) | 82.7 | 78.4 | 69.5 | 58.7 | 57.3 | 55.7 | 52.3 | 50.1 | 47.8 | 46.8 | 44.9 | 43.4 |

The data shown in Table 1 are measured deviations between the center of the disk 50 and the center of the rotation shaft 151 when 10 (ten) disk clamping apparatus whose "claw/arm" power ratio is 100~210%.

The measured result shows that a minimum deviation at 110% was 20 μm, a maximum deviation was 107 μm, and the average deviation was 78.4 μm. Furthermore, the average deviations at 120~210% were 69.5 μm, 58.7 μm, 57.3 μm, 55.7 μm, 52.3 μm, 50.1 μm, 47.8 μm, 46.8 μm, 44.9 μm and 43.4 μm respectively, which means that the deviation of less than 100 μm between the center of the disk 50 and the center of the rotation shaft 151 required by the spindle motor is met.

However, there are cases where the deviation of 125 μm that fails to meet the requirement of deviation demanded by the spindle motor at 100%. Furthermore, in case of being greater than 210%, the force for inserting the disk 50 into the clamp body 210 or for detaching the disk 50 from the clamp body 210 may be too great, which may affect the durability of the claw 220.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

INDUSTRIAL APPLICABILITY

The disk clamp apparatus and a spindle motor having the same according to the present invention has an industrial applicability in that a radial force of a claw on a disk is greater than a radial force of an arm to the disk to prevent the radial force of the arm applying to the disk from affecting the disk, whereby matched center of the clamp body with a center of the disk by the claw is not affected by an arm, such that the center of the disk comes to have a relatively smaller deviation from the center and to thereby enhance the reliability of the product.

The invention claimed is:

1. A disk clamping apparatus comprising:
   a clamp body configured to be inserted into an inner circumference of a disk;
   at least two claws formed in a cantilever way on a lateral surface of the clamp body to apply pressure to an inner lateral surface of the disk with a first elasticity; and
   at least two arms formed at a lateral surface of the clamp body to contact a corner formed by the inner circumference of the disk and an upper surface of the disk contacting the inner circumference of the disk and to apply pressure to the inner circumference of the disk with a second elasticity which is weaker than the first elasticity,
   wherein a total sum of the first elasticity generated from each claw is greater than a total sum of the second elasticity generated by each arm.

2. The apparatus of claim 1, wherein the first elasticity is 110% of the second elasticity.

3. The apparatus of claim 2, wherein the first elasticity is 210% of the second elasticity.

4. The apparatus of claim 1, wherein the first elasticity is 130~170% of the second elasticity.

5. The apparatus of claim 1, wherein a thickness of each claw is 0.45 mm~0.50 mm.

6. The apparatus of claim 1, wherein the arm includes a spring interposed between the clamp body and the arm to generate the second elasticity.

7. The apparatus of claim 1, wherein at least three claws are formed on the clamp body at an even distance thereamong, and the arms are formed among the claws at an even distance thereamong.

8. The apparatus of claim 1, wherein the claws and the arms are formed on the clamp body in the mutually same number.

9. A spindle motor having a disk clamping apparatus comprising:
   a stator;
   a rotor having a rotation shaft rotating relative to the stator;
   a clamp body coupled to the rotation shaft and inserted into an inner circumference of a disk; at least two claws formed in a cantilever way on a lateral surface of the clamp body to apply pressure to an inner lateral surface of the disk with a first elasticity; and at least two arms formed at a lateral surface of the clamp body to contact a corner formed by the inner circumference of the disk and an upper surface of the disk contacting the inner circumference of the disk and to apply pressure to the inner circumference of the disk with a second elasticity which is weaker than the first elasticity, wherein a total sum of the first elasticity generated from each claw is greater than a total sum of the second elasticity generated by each arm.

10. The spindle motor of claim 9, wherein the first elasticity is 110%~210% of the second elasticity.

11. The spindle motor of claim 10, wherein the first elasticity is 130%~170% of the second elasticity.

12. The spindle motor claim 9, wherein thickness of each claw is 0.45 mm~0.50 mm.

13. The spindle motor of claim 9, wherein the arm includes a spring interposed between the clamp body and the arm to generate the second elasticity.

14. The spindle motor of claim 9, wherein at least three claws are formed on the clamp body at an even distance thereamong, and the arms are formed among the claws at an even distance thereamong.

15. The spindle motor of claim 9, wherein the claws and the arms are formed on the clamp body in the mutually same number.

* * * * *